United States Patent [19]

Lannes

[11] Patent Number: 5,277,171
[45] Date of Patent: Jan. 11, 1994

[54] WATER HEATER HEAT TRAP

[75] Inventor: Eric M. Lannes, Kentwood, Mich.

[73] Assignee: Bradford-White Corporation, Ambler, Pa.

[21] Appl. No.: 12,267

[22] Filed: Feb. 2, 1993

[51] Int. Cl.$^5$ .............................................. F24H 1/00
[52] U.S. Cl. ................................... 126/362; 137/512; 137/854
[58] Field of Search ................ 126/362; 137/512, 854

[56] References Cited

U.S. PATENT DOCUMENTS

| 2,008,818 | 7/1935 | Corbett. | |
|---|---|---|---|
| 2,211,212 | 8/1940 | Langdon. | |
| 2,329,960 | 9/1943 | Verheul. | |
| 2,675,823 | 4/1954 | Langdon. | |
| 2,913,000 | 11/1959 | Roberts | 137/854 |
| 2,997,050 | 8/1961 | Ferguson. | |
| 3,010,441 | 11/1961 | Torre. | |
| 3,028,873 | 4/1962 | Kindred. | |
| 3,144,904 | 8/1964 | Kahn et al.. | |
| 4,054,152 | 10/1977 | Ito et al.. | |
| 4,185,946 | 1/1980 | Mitchell. | |
| 4,246,932 | 1/1981 | Raines. | |
| 4,286,573 | 9/1981 | Nickel | 126/362 |
| 4,579,104 | 4/1986 | Snavely. | |
| 4,633,853 | 1/1987 | Prill | 126/362 |
| 4,729,401 | 3/1988 | Raines. | |
| 4,964,394 | 10/1990 | Threatt | 126/362 X |

Primary Examiner—Robert G. Nilson
Attorney, Agent, or Firm—Austin R. Miller

[57] ABSTRACT

An energy conserving device for the prevention of heat loss resulting from convection currents in water heater systems comprising a housing component adapted for mounting on the water heater system inlet and outlet ports, a mounting component rigidly supported inside the housing component, and at least one seal component rigidly attached to the mounting component. The seal component is formed from a flexible material and extends from the mounting component to the inside surface of the housing component to make sealing contact with the housing component to prevent the flow of water caused by convection currents while allowing the flow of water when water is drawn from the water heater system.

16 Claims, 5 Drawing Sheets

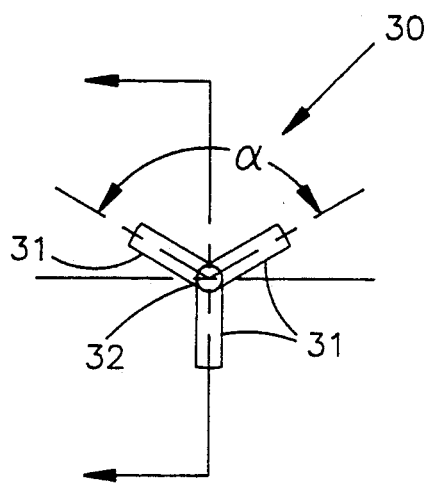
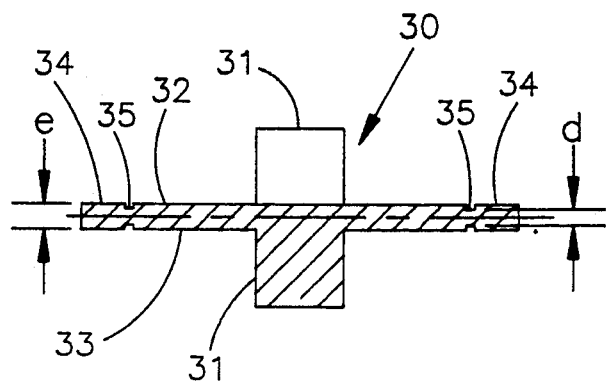
Fig. 3          Fig. 4
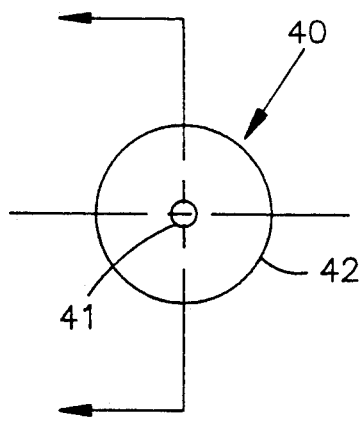
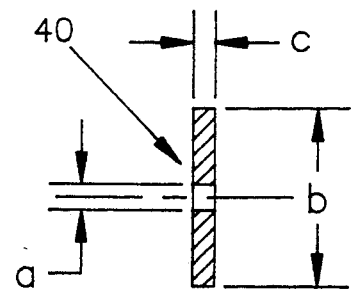
Fig. 5          Fig. 6

WATER HEATER HEAT TRAP

BACKGROUND OF THE INVENTION

This invention relates to a heat trap which prevents heat loss resulting from convection currents in water heater systems. The heat trap comprises a housing component adapted for mounting on water heater inlet and outlet ports, a mounting component rigidly supported within the housing, and at least one seal component rigidly attached to the mounting component and extending from the mounting component to the inside surface of the housing component. The seal component seals against water flow resulting from convection currents, thereby reducing energy loss from the water heater system, while permitting water flow when water is drawn from the water heater system.

FIELD OF THE INVENTION

Heat loss and the associated reduction in energy efficiency is known to occur in water heater systems. A significant portion of this heat loss occurs at the water heater inlet and outlet ports through which water is introduced into, and removed from, the water storage tank. Specifically, when water is neither being added to the water storage tank by means of the cold water inlet port nor removed from the water storage tank by means of the hot water outlet port, hot water from within the water storage tank tends to flow in the form of convection currents upward through the water inlet and outlet ports. Accordingly, these convection currents result in significant heat loss and reductions in water heater system energy efficiency.

Recently, new energy test procedures have been used relating to all residential gas, oil and electric water heaters. This reflects the on-going need to maximize the efficiency of residential and commercial water heater systems.

DESCRIPTION OF THE PRIOR ART

Several attempts have been made to introduce devices that eliminate the heat loss associated with convection currents through water heater inlet and outlet ports. Despite these attempts, however, manufacturers of water heater systems have thus far been frustrated in their efforts to eliminate this source of heat loss. For example, ball valves, such as those disclosed in U.S. Pat. No. 4,286,573 to Nickel and U.S. Pat. No. 4,964,394 to Threatt, have been incorporated in assemblies in an attempt to eliminate heat loss through water heater inlet and/or outlet ports. The use of such ball valves for this purpose, however, has several significant disadvantages.

Ball valves are essentially pressure-actuated seals that operate under the principle that greater pressure differentials provide improved sealing capabilities. Therefore, to provide pressure relief capability for ball valves, it is necessary to provide slits or other openings in the ball-valve seat. Such slits are especially necessary when ball valves are used in conjunction with water heater storage tanks in which pressure build-up may create dangerous conditions. These slits, however, permit convection currents to traverse the seal, creating the exact condition that the ball valve was installed to prevent. Moreover, these slits can also clog with impurities in the water heater system rendering the slits incapable of providing pressure relief and requiring expensive maintenance to avoid dangerous pressure build-up. They can also cause improper seating because of the presence of the clogged impurities.

Ball valves such as those utilized in the U.S. Pat. Nos. '573 and '394 also require a specific mounting orientation depending upon whether they are installed at the water heater system inlet or outlet port. Such ball valves only operate when mounted in the proper orientation, requiring costly labeling on the device and additional care at the time of installation. Moreover, incorrect installation will render the ball valve useless and restrict the flow of water to or from the water heater storage tank.

Ball valves are also limited in their application because such valves utilize balls having differing densities relative to that of water to allow the ball to float or sink in stagnant water to migrate toward its desired location. Therefore, ball valves installed at the inlet and outlet ports must utilize balls of different densities, and identical heat traps cannot be used at both ports. For the same reason, unless these ball valves are spring-actuated, they only operate when mounted vertically.

Heat traps that incorporate ball valves also create noise because the balls tend to rattle against the ball-valve seat or the piping wall. Accordingly, many problems are associated with heat trap assemblies containing the ball valves disclosed in the prior art.

Significant problems are also associated with other heat trap designs disclosed in the prior art. For example, U.S. Pat. No. 4,579,104 to Smavely discloses a heat trap assembly having one or more externally mounted flaps which inherently allow the passage of convection currents between the flaps. Also, heat trap assemblies which require a downward diversion of water before the water is discharged through the hot water outlet, as disclosed in U.S. Pat. No. 3,144,904 to Kahn, presents the water with a torturous path which impedes water flow and requires a specific mounting orientation. These are just some of the disadvantages associated with prior art heat trap devices.

Accordingly, there is a great and thus far unsatisfied demand for an energy conserving device for water heaters that prevents heat loss through water heater inlet and outlet ports, that can be mounted vertically or horizontally and in any orientation, and that effectively seals against convection currents while allowing for pressure relief of the water heater system.

OBJECTS OF THE INVENTION

It is an object of the present invention to provide an energy conserving device for water heaters capable of reducing heat loss through water heater inlet and outlet ports caused by convection currents.

It is another object of this invention to provide an inexpensive energy conserving device for water heaters capable of being mounted horizontally or vertically.

It is another object of this invention to provide an energy conserving device for water heaters that can be mounted in any orientation on either or both the water heater inlet or outlet ports.

It is another object of this invention to provide an energy conserving device for water heaters that provides for the relief of pressure that may build up within the water storage tank and the flow of water when water is drawn from the water heater system.

It is another object of this invention to provide an energy conserving device for water heaters that is adaptable to any diameter tube and is inexpensive to produce and easy to install.

It is yet another object of the present invention to provide an energy conserving device for water heaters that can be integrally mounted with a dip tube at the water storage tank inlet port or with an anode at the water storage tank outlet port without the need for additional fittings.

Finally, it is an object of this invention to provide an energy conserving device for water heaters that utilizes trapped water to create an insulating barrier between water within the storage tank and water outside the storage tank.

Other objects and advantages of the present invention will become apparent to those skilled in the art from the drawings, the detailed description of preferred embodiments and the appended claims.

SUMMARY OF THE INVENTION

The present invention provides an energy conserving device for water heaters comprising a housing component, a mounting component rigidly supported within the housing component, and at least one seal component rigidly attached to the mounting component and contacting the inside surface of the mounting component. The housing component is adapted so that the energy conserving device can be mounted on either the inlet or outlet port of a standard water heater. The mounting component has at least two support legs to support the mounting component within the housing component in such a way that a shaft portion of the mounting component has an axis parallel to the centerline of the housing component. The seal component is formed from a flexible material to permit the creation of a seal against the inside surface of the mounting component to prevent the passage of convection currents and deformation to permit pressure relief when the pressure differential across the seal exceeds a threshold level attributable to convection currents during water draw-off.

The energy conserving device according to the present invention can be mounted both vertically or horizontally on a standard water storage tank. Also, the new energy conserving device can be mounted on either the water heater inlet port or outlet port without requiring a specific orientation to operate properly.

The new energy conserving device can also be used in conjunction with standard dip tubes at the water heater inlet port as well as standard anodes at the water heater outlet port without the need for additional fittings.

When two or more seal components are utilized in each energy conserving device, the new device uses water trapped between the seal components to act as an insulating barrier between the water in the water storage tank and water outside the water storage tank. This feature confers an additional energy conserving benefit.

BRIEF DESCRIPTION OF THE DRAWINGS

FIG. 3 shows a top view of a preferred embodiment of the mounting component of the energy conserving device for water heaters.

FIG. 4 shows a cross-sectional side view of a preferred embodiment of the mounting component of the energy conserving device for water heaters.

FIG. 5 shows a top view of a preferred embodiment of the seal component of the energy conserving device for water heaters prior to installation in the housing component.

FIG. 6 shows a cross-sectional side view of a preferred embodiment of the seal component of the energy conserving device for water heaters prior to installation in the housing component.

DETAILED DESCRIPTION OF THE INVENTION

Figures 1, 2:
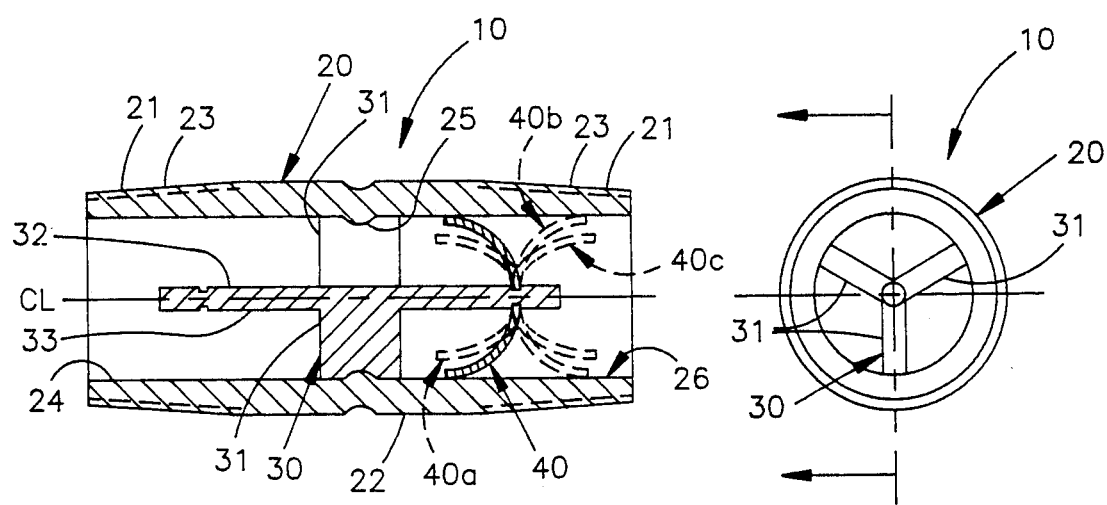
FIG. 1 shows a cross-sectional side view of an embodiment of the energy conserving device for water heaters.
FIG. 2 shows a top view of the embodiment of the energy conserving device for water heaters shown in FIG. 1.

The following description is intended to refer to specific embodiments of the present invention illustrated in the drawings. This description is not intended to define or limit the scope of the invention, which is defined separately in the claims that follow.

Referring to FIG. 1, the number 10 designates an embodiment of the energy conserving device for water heaters shown by means of a cross-sectional side view. The energy conserving device 10 has a housing component 20, a mounting component 30 supported within the housing component 20, and a seal component 40 rigidly attached to the mounting component 30 and contacting the housing component 20.

The housing component 20 has two end portions 21 and an outside surface 22. The housing component 20 also has male pipe threads 23 formed on the outside surface 22 at the end portions 21 of the housing component 20. The threads 23 are adapted to permit the threaded mounting of the housing component 20 of the energy conserving device 10 at the inlet and outlet ports of standard water storage tanks. It is preferred that these threads 23 are male pipe threads to provide a substantially water-tight connection.

The housing component 20 of the energy conserving device 10 also has an inside surface 24 with a raised portion 25 and a sealing surface 26. Finally, the housing component 20 of the energy conserving device 10 has a centerline designated CL.

The mounting component 30 of the energy conserving device 10 has three support legs 31 extending radially outwardly approximately from the centerline CL of the housing component 20 to the inside surface 24 of the housing component 20 at the raised portion 25 on the inside surface 24. The mounting component 30 also has a shaft portion 32 extending perpendicularly from the support legs 31. The shaft portion 32 of the mounting component 30 also has an outside surface 33 and an axis parallel to the centerline CL of the housing component 20.

The seal component 40 of the energy conserving device 10 is rigidly mounted on the shaft portion 32 of the mounting component 30, extending from the outside surface 33 of the shaft component 32 to the sealing surface 26 on the inside surface 24 of the housing component 20.

FIG. 2 illustrates the embodiment of the energy conserving device 10 shown in FIG. 1 as viewed from the top without the seal component 40. That figure shows the mounting component 30 rigidly supported within the housing component 20 by means of three support legs 31. Although this embodiment of the energy conserving device 10 is depicted as having a mounting component 30 having three support legs 31, it is apparent that the mounting component 30 can also have two, four, or even more support legs. It is preferred, however, that the mounting component 30 have three support legs 31 in order to center the shaft portion 32 and securely support the mounting component 30 within the housing component 20 without unduly restricting the available area for fluid flow through the housing component 20.

FIG. 3 of the drawings illustrates the mounting component 30 as viewed from the top. The support legs 31 of the mounting component 30 are shown as being evenly spaced from each other. Accordingly, the angle $\alpha$ between the support legs 31 is constant. Here, where the mounting component 30 has three support legs 31, the angle $\alpha$ is approximately 120° between each of the three support legs 31. This is a preferred configuration for the support legs. However, as stated earlier, two or more support legs 31 oriented at any angle $\alpha$ can be used to rigidly support the mounting component within the housing component.

FIG. 4 depicts the mounting component 30 from a cross-sectional side view according to the cross-section designation in FIG. 3. In addition to the support legs 31, shaft portion 32 and outside surface 33 of the mounting component 30, FIG. 4 illustrates end portions 34 and grooves 35 formed in the outside surface 33 of the shaft portion 32. These grooves 35 are adapted to rigidly capture the seal component 40 of the energy conserving device 10. Accordingly, the grooves 35 have a diameter d which is smaller than the outside diameter e of the shaft portion 32.

While the groove 35 is a preferred means of capturing the seal component 40, other means of capturing the seal component 40 are contemplated by the present invention. For example, the seal component 40 could be captured on the mounting component 30 by means of retaining rings, or the seal component 40 could be bonded to the outside surface 33 of the shaft portion 32. Similarly, the shaft portion 32 of the mounting component 30 can have various cross-sectional shapes and need not have a circular cross-sectional shape.

FIG. 5 illustrates the seal component 40 of the energy conserving device 10 prior to installation as shown from a top view. The seal component 40 has an inside surface 41 and an outside surface 42. As depicted in the cross-sectional view in FIG. 6, the seal component 40 also has an inside diameter a, an outside diameter b and a thickness c. The inside diameter a is approximately equal to the outside diameter d of the groove 35 in the outside surface 33 of the shaft portion 32 of the mounting component 30 and smaller than the outside diameter e of the shaft portion 32. Accordingly, the seal component 40 is maintained within the groove 35 so as to prevent the axial migration of the seal component 40 where the inside surface 41 of the seal component 40 contacts the mounting component 30.

The outside diameter b of the Beal component 40 is larger than the diameter of the sealing surface 26 on the inside surface 24 of the housing component 20 such that the outside surface 42 of the seal component 40 is in contact with the sealing surface 26 of the housing component 20. The seal component 40 is formed from a flexible material so that the seal component 40 can react to pressure differentials in water within the housing component 20. The seal component 40 must also have memory so that it will not be deformed into a non-functional shape. Preferably, the seal component 40 is formed from an elastomer having sufficient flexibility and memory to yield to water flow while resuming its desired shape when water flow is discontinued. Typical elastomers include silicones or "Santaprem" and other elastomeric or rubbery polymers which have the ability to flex back and forth repeatedly. It is even more preferable if the seal component 40 is formed from an elastomer having a durometer in the range from about 30 to 70.

The seal component 40 must, however, be formed from a material capable of withstanding the full range of temperatures associated with standard water heater systems. Accordingly, the material used for the seal component 40 must maintain its flexibility and memory through the full range of water temperatures. Seal components 40 are, therefore, preferably formed from elastomers such as silicone and other similar elastomeric materials.

As indicated in FIG. 1, the seal component 40 has a cupped cross-sectional shape when it is installed on the mounting component 30 and within the housing component 20. Accordingly, the outside surface 42 of the seal component 40 becomes axially displaced from the inside surface 41 of the seal component 40. Although FIG. 1 depicts the outside surface 42 of the seal component 40 displaced to the left of the inside surface 41 of the seal component 40, the outside surface 42 can be equally displaced to the right of the inside surface 41 of the seal component 40 as indicated by 40b, depending upon the direction in which the seal component 40 is installed within the housing component 20 as well as other factors including the orientation in which the energy conserving device 10 is installed on the water storage tank port, upon which storage tank port the energy conserving device 10 is mounted, the direction of water flow through the housing 20, and other factors to be discussed below in reference to the operation of the energy conserving device 10.

Referring to FIG. 1, the installation of the new energy conserving device will be explained. The energy conserving device 10 is threaded into one or both of the inlet and outlet ports of a standard water heater storage tank by means of the threads 23 on the outside surface 22 of the housing component 20. Identical energy conserving devices 10 can be mounted in any orientation on either the water heater storage tank inlet or outlet port. Accordingly, the energy conserving device 10 as shown in FIG. 1 can be mounted with the end portion 34 of the shaft portion 32 on which the seal component 40 is attached facing upwardly or downwardly on both the inlet and outlet ports of the water heater storage tank.

Similarly, the cup-type cross-sectional shape of the seal component 40 within the housing component 20 may assume a variety of orientations. For example, the convex surface of the cupped cross-sectional shape of the installed seal component 40 may face toward or away from the water storage tank when mounted on either the inlet or outlet port.

The energy conserving device 10 can be mounted horizontally, vertically or at any angle, and the seal component 40 sealingly contacts the sealing surface 26 of the housing component 20 independent of the energy conserving device's orientation. Traditional heat trap devices which rely on floating or sinking balls in a ball valve cannot be mounted horizontally unless they are spring-mounted. However, the new energy conserving device 10 relies only upon pressure differentials across its seal component 40 and, therefore, can be mounted horizontally without sacrificing performance.

The fact that identical energy conserving devices 10 can be mounted in any orientation on either the inlet or outlet ports confers several significant benefits. First, this feature virtually eliminates the danger associated with improper installation of other designs. For example, traditional heat traps can drastically restrict water flow or even prevent pressure relief when installed in the wrong orientation. At best, such traditional heat traps, when improperly installed, simply will not operate to conserve energy. Second, the energy conserving device 10 eliminates the need for additional care during installation and the expense of re-installation when such care is not taken. Finally, the energy conserving device 10 eliminates the need to place labels or other markings on the outside of the device to indicate the proper mounting orientation.

Still referring to FIG. 1, the operation of the new energy conserving device will be explained. In operation, the outside surface 42 of the seal component 40 sealingly contacts the sealing surface 26 on the inside surface 24 of the housing component 20. This sealing contact between the seal component 40 and the housing component 20 substantially seals against the flow of water through the housing component 20 caused by convection currents in the water heater system. More specifically, hot water within the water heater storage tank tends to migrate by means of convection currents upward and through the water storage tank's inlet and outlet ports. The seal component 40 substantially seals against these convection currents.

The seal component 40 is capable of preventing flow caused by convection currents without regard for the direction of such currents. In other words, the seal component 40 will seal against convection currents approaching the convex surface of the installed seal component 40 as well as convection currents approaching the concave surface of the installed seal component 40.

When, however, the pressure of water on one side of the seal component 40 becomes significantly greater than the water pressure on the other side of the seal component 40, i.e., when water is drawn from the water heater system, the flexible seal component 40 will deform to permit the relief of the increased pressure. In other words, the seal component 40 will provide pressure relief when the pressure differential across the seal component 40 exceeds the threshold level attributable to convection currents during water draw-off.

When water of sufficient pressure contacts the convex surface of the seal component 40, the resulting pressure differential will cause the outside surface 42 of the seal component 40 to move away from the sealing surface 26 of the housing component 20, causing the seal component 40 to assume a tighter cupped cross-sectional shape as indicated by 40a in FIG. 1. If water at elevated pressure contacts the concave surface of the seal component 40, the resulting pressure differential will cause the cupped seal component 40 to flip within the housing component 20 such that the outside surface 42 of the seal component 40 contacts the sealing surface 26 of the housing component 20 at a location further distal to the higher pressure water as indicated by 40b. The pressure differential will then cause the outside surface 42 of the inverted seal component 40b to move away from the sealing surface 26 of the housing component 20 as indicated by 40c, causing the relief of pressure past the inverted seal component 40b as described above. Throughout the operation of the energy conserving device 10, the inside surface 41 of the seal component 40 remains captured within the groove 35 in the shaft portion 32 of the mounting component 30.

It has also been discovered that the movement of the outside surface 42 of the seal component 40 against the sealing surface 26 of the housing component 20 provides a self-cleaning effect. Specifically, the periodic inversion of the seal component 40 in response to water flow causes the outside surface 42 of the seal component 40 to wipe the sealing surface 26 of the housing component 20. This has the effect of removing, or preventing the build-up of, foreign materials on the sealing surface 26 of the housing component 20. For example, pipe dope used to seal pipe threads may be inadvertently introduced into the water heater system and may tend to solidify on the piping walls. Such pipe dope, which could clog a ball valve, is removed from the sealing surface 26 of the housing component 20 due to the reciprocating action of the outside surface 42 of the seal component 40.

Figure 7:
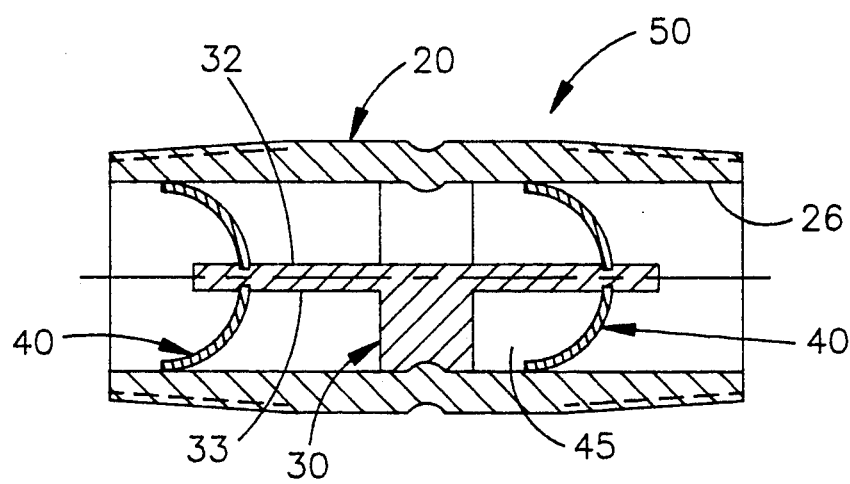
FIG. 7 shows a cross-sectional side view of another embodiment of the energy conserving device for water heaters having two seal components.

FIG. 7 illustrates another embodiment of the energy conserving device 50 having two seal components 40 shown from a cross-sectional side view. The energy conserving device 50 has a housing component 20, a mounting component 30 rigidly supported within the housing component 20, and two serially mounted seal components 40 rigidly attached to the mounting component 30. As in the energy conserving device shown in FIG. 1, the seal components 40 extend from the outside surface 33 of the shaft portion 32 of the mounting component 30 to the sealing surface 26 of the housing component 20.

The seal components 40 of the energy conserving device 50 operate in substantially the same manner as the seal component 40 of the energy conserving device 10 shown in FIG. 1. Specifically, each seal component 40 acts to substantially seal against the flow of water caused by convection currents while allowing pressure relief when the pressure differential across the seal components 40 exceeds the threshold level attributable to convection currents.

Because the energy conserving device 50 has two serially mounted seal components 40, that embodiment provides additional sealing ability. This embodiment of the energy conserving device 50 also, however, traps a small volume of water between the serially mounted seal components 40. This volume of water, indicated by the number 45 in FIG. 7, acts as an insulating barrier between water within the water storage tank and water in the piping system leading to or emerging from the water storage tank. This insulating barrier further reduces heat loss from the water heater system by reducing the transfer of heat from the water heating system. In essence, an energy conserving device 50 having two serially mounted seal components 40 functions in a manner similar to that of a thermopane window: The seal components 40 approximate the parallel glass panes, and the trapped water 45 approximates the air contained between the glass panes.

The trapped water 45 between the seal components 40 will remain stagnant until the pressure differential across the seal components 40 exceeds the threshold level attributable to convection currents. When the pressure differential exceeds that threshold level, the seal components 40 will deform to allow relief of pressure.

Although the energy conserving device 50 is shown as having two seal components, it is contemplated that an energy conserving device according to this invention could have three or more serially mounted seal components to amplify the device's energy conserving effect.

Figure 8:
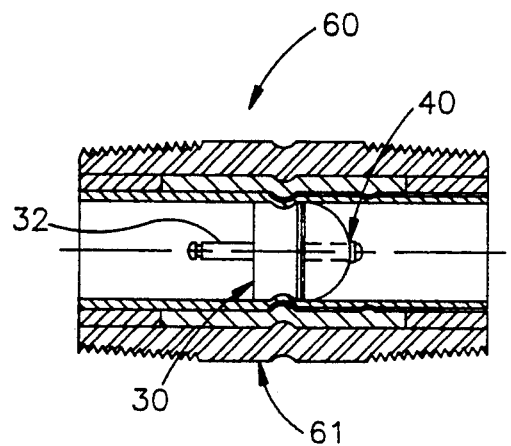
FIG. 8 shows a cross-sectional side view of another embodiment of the energy conserving device for water heaters having a dielectric fitting.

FIG. 8 illustrates an energy conserving device 60 having a dielectric fitting. Although this embodiment is shown as having only one seal component 40, it can be produced with two or even more seal components 40 mounted serially within the housing component. As with the previous embodiments, the energy conserving device 60 has a mounting component 30 and a seal component 40. However, the housing component 20 of previously described embodiments is replaced with a dielectric isolation fitting 61, and the seal component 40 is positioned within the dielectric fitting 61. The dielectric fitting 61 prevents contact between dissimilar metals in the presence of water. This feature prevents corrosion at the fittings and, therefore, extends the life expectancy of the water heater system. The dielectric fitting 61 also protects against electrical shorts where electrical isolation is desired. Finally, the dielectric fitting 61 functions to save additional energy by reducing the energy lost by the transfer of heat through the fitting.

Figure 9:
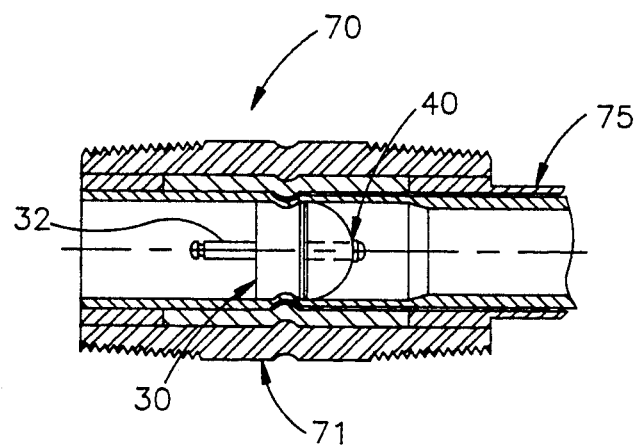
FIG. 9 shows a cross-sectional side view of another embodiment of the energy conserving device for water heaters wherein a dip tube is integrally attached to the energy conserving device.

FIG. 9 illustrates an energy conserving device 70 having a dielectric fitting 71 and an integrally attached dip tube 75. Dip tubes are often used at inlet ports of water heater storage tanks to inject water well into the storage tank to promote water circulation and optimize water-heating characteristics. Accordingly, the energy conserving device 70 has an integrally attached dip tube 75 so that the energy conserving device 70 with the dip tube 75 can be easily installed together in the inlet port of a water storage tank without the need for additional fittings or orifices.

Figure 10:
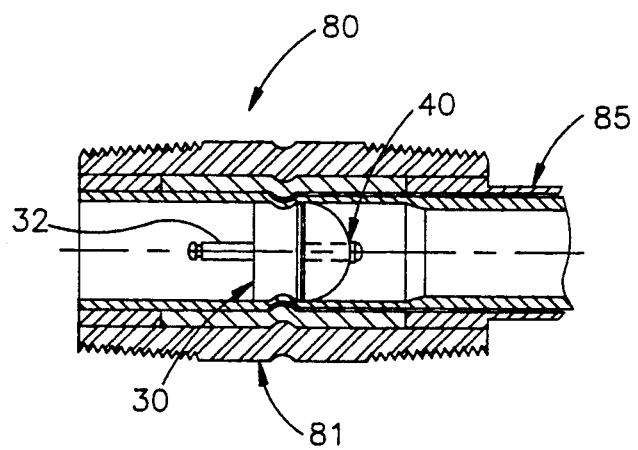
FIG. 10 shows a cross-sectional side view of another embodiment of the energy conserving device for water heaters wherein an anode is integrally attached to the energy conserving device.
Figure 11:
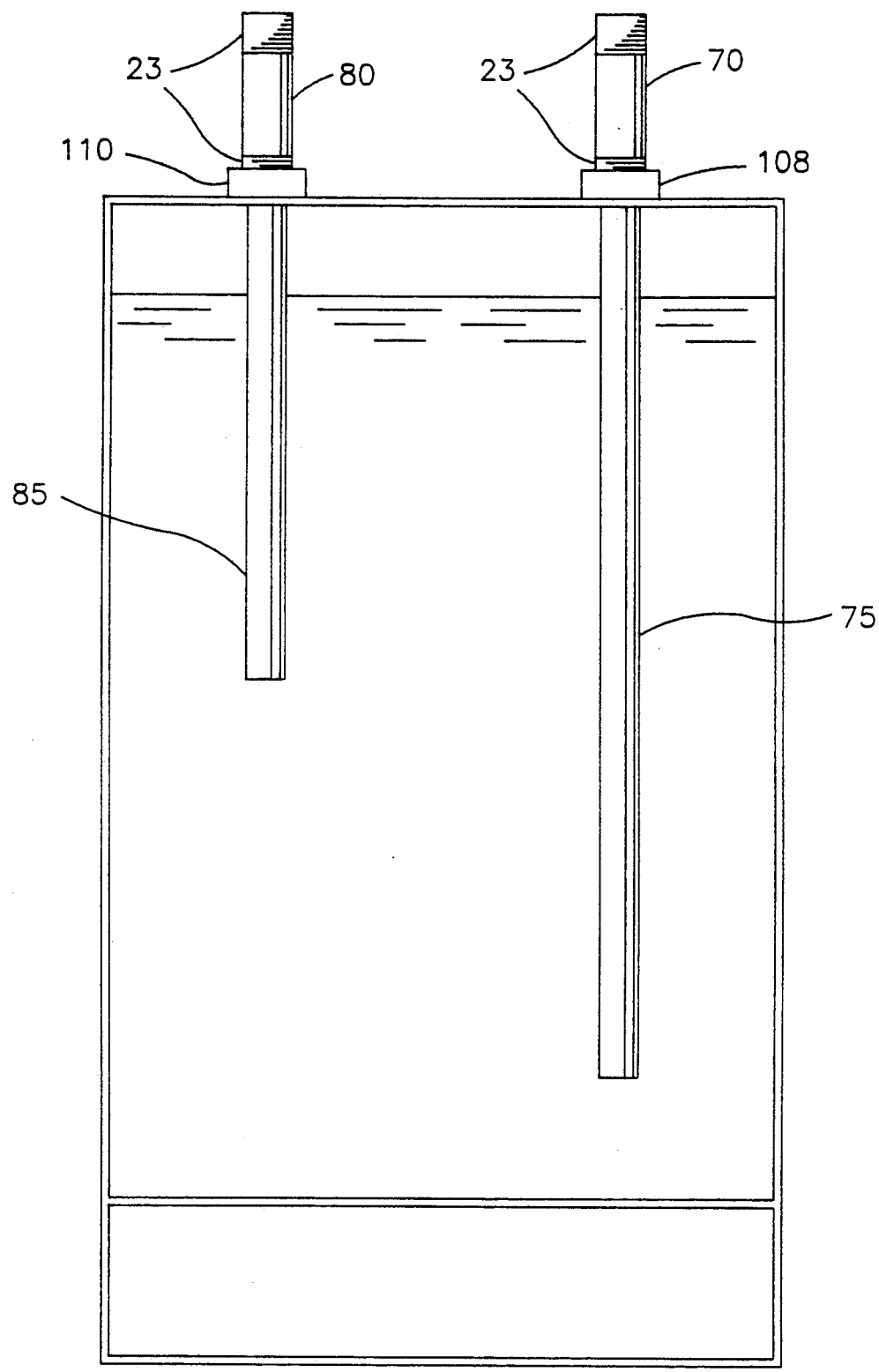
FIG. 11 is a schematic view of a water heater in accordance with this invention, showing inlet port 108 and outlet port 110.

FIG. 10 illustrates an energy conserving device 80 having a dielectric fitting 81 and an anode 85. It is known that the use of an anode such as a magnesium rod within a water storage tank reduces the rate of corrosion within the water heater storage tank. Such an anode may be introduced from any orifice in the water heater storage tank, including the outlet port of the storage tank. Accordingly, the energy conserving device 80 has an anode 85 integrally attached to the dielectric fitting, and the assembly can be installed in the outlet port of a water storage tank without the need for special fittings or orifices.

If desired, many changes and modifications to the energy conservation device for water heaters described herein can be made without departing from the spirit and scope of this invention. These changes and modifications can relate to the structure of the energy conserving device assembly or to specific components of the energy conserving device themselves.

The energy conserving device assembly can vary in terms of its length, diameter or the means by which it is mounted at the water storage tank's inlet and outlet ports. For example, the energy conserving device could be mounted by means of male or female threads, pipe or straight threads, or one of many non-threaded coupling means known in the art.

The housing component can be metallic, formed from carbon steel, stainless steel or other alloys. The housing component can also be formed from any plastic material capable of withstanding contact with water at the elevated temperatures and pressures associated with closed water heating systems. The housing component can be formed from a preformed nipple or coupling component, or may be formed from solid rod, tubing or pipe stock. The raised portion 25 on the inside surface 24 of the housing component 20 shown in FIG. 1 may be created by rolling the exterior of the housing component, molding, or any other means known in the art. Instead of the raised portion 25 in the inside surface 24 of the housing component 20, the inside surface 24 of the housing component 20 may have a counterbore suited to capture the support legs 31 of the mounting component 30.

The mounting component 30 may have two or more support legs 31. The support legs 31 can be tapered at their top and bottom to reduce any restriction of water flow through the energy conserving device. The shaft portion 32 of the mounting component 30 may be provided with any means for capturing and rigidly supporting the seal component 40. Also, the shaft portion 32 of the mounting component may have any cross-sectional shape and may be tapered at its ends to reduce the restriction of water flow through the energy conserving device. Finally, the mounting component 30 may have any configuration capable of supporting at least one seal component such that the center of the seal component remains near the centerline of the housing component.

The seal component 40 can be formed from any material capable of flexing in response to pressure differentials above a threshold level attributable to convection currents and having sufficient memory so as not to permanently deform. The thickness c of the seal component 40 may be constant or may vary to provide optimum sealing characteristics. For example, the thickness c of the seal component 40 may decrease toward the outer surface 42 of the seal component 40, and the seal component 40 may taper to a point at the outer surface 42 or be radiused to yield constant and equal amounts of sealing contact.

This invention has a number of important features and advantages in any embodiment or construction. The energy conserving device for water heaters described herein provides a means for conserving energy by reducing heat loss associated with convection currents in water heater systems. The new energy conserving device can be mounted in any horizontal, vertical or inclined orientation, and identical energy conserving devices can be mounted on both the water storage tank inlet and outlet ports. The seal component substantially seals against water flow caused by convection currents, and the serial mounting of two or more seal components creates an insulating barrier and an increased energy conserving effect. Also, the reciprocal action of the outer surface of the seal components provides a self-cleaning effect, periodically removing foreign materials from the inside surface of the housing component. Finally, the energy conserving device described herein can be mounted integrally with a dip tube or an anode without the need for additional fittings or orifices. Other advantages of the new energy conserving device are explicitly or implicitly disclosed throughout the specification.

The seal member or members may be flexible diaphragms other than cup-shaped, for example flat discs, or discs with accordion-shaped cross sections or others. All of these are intended to be embraced by the generic expression "flexible seal" as used in the appended claim 5.

Although the flexible seals aa shown in the drawings are attached to the dip tube (inlet) or the (anode) outlet, they may be applied to any or all of the tubes or pipes conducting cold or hot water into or out of the hot water storage tank. For example, water heaters according to this invention may include auxiliary tubes for supplying hot water to a room heating device such as a so-called "fan coil" and the flexible seal of this invention may be included in the outlet or inlet port (or both) connected to the room heating or other auxiliary device.

We claim:

1. An energy conserving water heater capable of prevention of heat loss resulting from convection currents, said water heater comprising a water storage tank; an inlet port and an outlet port; means forming a chamber for containing fluid and adapted for connection to said inlet and outlet ports; means of support within said chamber; means providing a flexible Beal attached to said support, said flexible seal extending across the space within said chamber and capable of making substantial sealing contact with the interior of said chamber to prevent flow of convection currents when water is not being introduced into or drawn from said water storage tank while allowing flow of water in normal use when water is introduced into or drawn from said water storage tank.

2. The energy conserving water heater described in claim 1, wherein said flexible sealing means is formed from an elastomeric material.

3. The energy conserving water heater described in claim 2, wherein said elastomeric material has a durometer in the range of from about 30 to about 70.

4. The energy conserving water heater described in claim 2, wherein said elastomeric material is selected from the group consisting of silicone and rubbery flexible polymers.

5. The energy conserving water heater described in claim 1, wherein at least two of said flexible sealing means are mounted on said support.

6. The energy conserving water heater described in claim 1, wherein said energy conserving water heater further comprises an insulating means mounted within said chamber.

7. The energy conserving water heater described in claim 1, wherein said energy conserving water heater further comprises a dip tube attached to the chamber.

8. The energy conserving water heater described in claim 1, wherein said energy conserving water heater further comprises an anode integrally attached to the chamber.

9. An energy conserving device for the prevention of heat loss resulting from convection currents in water heater systems having a water storage tank, an inlet port, and an outlet port, said energy conserving device comprising:

a housing component adapted for mounting at the inlet and outlet ports of said water heater system, said housing component having a centerline and an inside surface with a raised portion and a sealing surface;

a mounting component rigidly supported proximal to the raised portion in the inside surface of said housing component, said mounting component having a shaft portion with end portions and an axis substantially parallel to the centerline of said housing component, said mounting component also having at least two support legs extending radially outwardly from the axis of said shaft portion to the inside surface of said housing component; and a flexible seal component rigidly attached to an end portion of the shaft portion of said mounting component, said seal component extending from the shaft portion of said mounting component to the sealing surface on the inside surface of said housing component and making sealing contact with said housing component to prevent the flow of water caused by convection currents when water is not being drawn from said water storage tank and allowing the flow of water when water is drawn from said water storage tank.

10. The energy conserving device described in claim 9, wherein said flexible seal component is formed from an elastomeric material.

11. The energy conserving device described in claim 10, wherein said elastomeric material has a durometer in the range of from about 30 to about 70.

12. The energy conserving device described in claim 10, wherein said elastomeric material is selected from the group consisting of silicone and rubbery flexible polymers.

13. The energy conserving device described in claim 9, wherein at least two of said seal components are serially mounted on the end portions of the shaft portion of said mounting component, said seal components trapping water and creating an insulating barrier between water inside said water storage tank and water outside said water storage tank.

14. The energy conserving device described in claim 9, wherein said energy conserving device further comprises an insulating sheath integrally mounted within said housing component.

15. The energy conserving device described in claim 9, wherein said energy conserving device further comprises a dip tube integrally attached to the housing component of said energy conserving device.

16. The energy conserving device described in claim 9, wherein said energy conserving device further comprises an anode integrally attached to the housing component of said energy conserving device.

* * * * *

UNITED STATES PATENT AND TRADEMARK OFFICE
CERTIFICATE OF CORRECTION

PATENT NO. : 5,277,171
DATED : January 11, 1994
INVENTOR(S) : Eric M. Lannes

It is certified that error appears in the above-identified patent and that said Letters Patent is hereby corrected as shown below:

In Column 11, line 32, please change "Beal" to --seal--.

Signed and Sealed this

Twenty-fourth Day of May, 1994

Attest:

BRUCE LEHMAN

Attesting Officer     Commissioner of Patents and Trademarks